US012810693B2

(12) United States Patent
Fulton et al.

(10) Patent No.: US 12,810,693 B2

(45) **Date of Patent: *Nov. 24, 2026**

(54) METHOD AND SYSTEM FOR CONDUCTING WAGERS

(71) Applicant: Castle Island IP Holding LLC, Charlottesville, VA (US)

(72) Inventors: Daniel Fulton, Lancaster, PA (US); Joshua Paul Larson, Zeeland, MI (US); Alan Roireau, Charlottesville, VA (US)

(73) Assignee: CASTLE ISLAND IP HOLDINGS LLC, Charlottesville, VA (US)

( * ) Notice: Subject to any disclaimer, the term of this patent is extended or adjusted under 35 U.S.C. 154(b) by 299 days.

This patent is subject to a terminal disclaimer.

(21) Appl. No.: 18/598,248

(22) Filed: Mar. 7, 2024

(65) Prior Publication Data

US 2024/0212459 A1 Jun. 27, 2024

Related U.S. Application Data

(63) Continuation of application No. 17/572,483, filed on Jan. 10, 2022, now Pat. No. 11,948,434.

(60) Provisional application No. 63/144,660, filed on Feb. 2, 2021.

(51) Int. Cl.

| | |
|---|---|
| ***G06F 9/24*** | (2006.01) |
| ***A63F 13/00*** | (2014.01) |
| ***G06F 11/00*** | (2006.01) |
| ***G06Q 50/34*** | (2012.01) |
| ***G07F 17/32*** | (2006.01) |

(52) U.S. Cl.

CPC ......... *G07F 17/3288* (2013.01); *G06Q 50/34* (2013.01); *G07F 17/3225* (2013.01); *G07F 17/3258* (2013.01)

(58) Field of Classification Search

CPC .. G07F 17/32; G07F 17/3201; G07F 17/3213; G07F 17/3214; G07F 17/3222

USPC .............................. 463/1, 20, 22, 25, 30, 39

See application file for complete search history.

(56) References Cited

U.S. PATENT DOCUMENTS

| | | | |
|---|---|---|---|
| 4,874,177 | A | 10/1989 | Girardin |
| 5,275,400 | A | 1/1994 | Weingardt et al. |
| 5,411,258 | A | 5/1995 | Wilson et al. |
| 5,830,068 | A | 11/1998 | Brenner et al. |
| 5,957,775 | A | 9/1999 | Cherry |
| 5,997,400 | A | 12/1999 | Seelig et al. |
| 6,120,376 | A | 9/2000 | Cherry |

(Continued)

FOREIGN PATENT DOCUMENTS

| | | | |
|---|---|---|---|
| AU | 758508 | B2 | 3/2003 |
| AU | 784601 | B2 | 5/2006 |

(Continued)

*Primary Examiner* — Adetokunbo O Torimiro

(74) *Attorney, Agent, or Firm* — Workman Nydegger

(57) ABSTRACT

A gaming system and method are provided that facilitate gameplay on one or a plurality of gameplay stations connected to a gaming server. The gaming server is configured to identify, upon receiving a gameplay request, a first plurality of events to execute. The gaming server is configured to receive a wager from a player and to compare the wager against a scorecard for the plurality of events, with a payout determined from the correct and incorrect predictions. The first plurality of events is determined in a time-dependent manner so as to approximate the gameplay experience of live and/or in-person gaming experiences.

23 Claims, 2 Drawing Sheets

(56) References Cited

U.S. PATENT DOCUMENTS

| | | | |
|---|---|---|---|
| 6,152,822 | A | 11/2000 | Herbert |
| 6,166,736 | A | 12/2000 | Hugh |
| 6,252,597 | B1 | 6/2001 | Lokuge |
| 6,309,307 | B1 | 10/2001 | Krause et al. |
| 6,358,150 | B1 | 3/2002 | Mir et al. |
| 6,450,887 | B1 | 9/2002 | Mir et al. |
| 6,544,121 | B2 | 4/2003 | Deweese et al. |
| 6,554,709 | B1 | 4/2003 | Brenner et al. |
| 6,786,824 | B2 | 9/2004 | Cannon |
| 6,837,791 | B1 | 1/2005 | Mcnutt et al. |
| 6,887,156 | B2 | 5/2005 | Deweese et al. |
| 6,893,018 | B2 | 5/2005 | Inoue |
| 7,027,463 | B2 | 4/2006 | Mathew et al. |
| 7,264,546 | B2 | 9/2007 | Marshall et al. |
| 7,379,886 | B1 | 5/2008 | Zaring et al. |
| 7,454,380 | B2 | 11/2008 | Garahi et al. |
| 7,628,695 | B2 | 12/2009 | Lee |
| 7,645,191 | B1 | 1/2010 | Mckeever |
| 7,648,414 | B2 | 1/2010 | Mcnutt et al. |
| 7,774,259 | B1 | 8/2010 | Satterfield et al. |
| 7,775,880 | B2 | 8/2010 | Downes |
| 7,892,092 | B2 | 2/2011 | Matthews et al. |
| 7,950,990 | B2 | 5/2011 | Marshall et al. |
| 7,996,296 | B2 | 8/2011 | Lange |
| 8,029,352 | B2 | 10/2011 | Lind et al. |
| 8,081,846 | B2 | 12/2011 | Ignatchenko et al. |
| 8,083,584 | B2 | 12/2011 | Greiner et al. |
| 8,118,675 | B2 | 2/2012 | Horowitz et al. |
| 8,221,225 | B2 | 7/2012 | Laut |
| 8,241,110 | B2 | 8/2012 | Katz et al. |
| 8,277,296 | B2 | 10/2012 | Okada |
| 8,292,729 | B2 | 10/2012 | Vlazny et al. |
| 8,342,959 | B2 | 1/2013 | Mahaffey et al. |
| 8,360,835 | B2 | 1/2013 | Strause et al. |
| 8,370,249 | B2 | 2/2013 | Lange et al. |
| 8,419,544 | B2 | 4/2013 | Mcnutt et al. |
| 8,532,798 | B2 | 9/2013 | Ferraro, III et al. |
| 8,597,109 | B2 | 12/2013 | Herrmann et al. |
| 8,636,571 | B2 | 1/2014 | Miller |
| 8,684,847 | B2 | 4/2014 | Grundstedt et al. |
| 8,721,440 | B2 | 5/2014 | Ward et al. |
| 8,777,735 | B1 | 7/2014 | Fine et al. |
| 8,905,832 | B2 | 12/2014 | Miller |
| 8,968,089 | B2 | 3/2015 | Miodunski |
| 9,047,737 | B2 | 6/2015 | Brooks et al. |
| 9,053,608 | B2 | 6/2015 | Brooks et al. |
| 9,064,369 | B2 | 6/2015 | Schueller et al. |
| 9,153,101 | B2 | 10/2015 | Cannon et al. |
| 9,218,721 | B2 | 12/2015 | Herbert |
| 9,251,547 | B2 | 2/2016 | Fontaine et al. |
| 9,355,102 | B2 | 5/2016 | Thukral et al. |
| 9,437,078 | B2 | 9/2016 | Keech |
| 9,443,392 | B2 | 9/2016 | Keech |
| 9,633,518 | B2 | 4/2017 | Herbert et al. |
| 9,633,519 | B2 | 4/2017 | Zimmerl et al. |
| 9,652,926 | B2 | 5/2017 | Gelman et al. |
| 9,747,748 | B2 | 8/2017 | Corckran et al. |
| 9,965,752 | B2 | 5/2018 | Schrotter et al. |
| 10,229,556 | B2 | 3/2019 | Weber et al. |
| 10,269,215 | B2 | 4/2019 | Prabhu |
| 10,395,471 | B2 | 8/2019 | Lind et al. |
| 10,553,077 | B2 | 2/2020 | Miller |
| 10,818,126 | B2 | 10/2020 | Gelman et al. |
| 10,909,796 | B2 | 2/2021 | Miller et al. |
| 10,997,825 | B2 | 5/2021 | Neely et al. |
| 11,004,310 | B2 | 5/2021 | Mckeever et al. |
| 11,055,967 | B2 | 7/2021 | Miller et al. |
| 11,069,184 | B2 | 7/2021 | Lind et al. |
| 11,074,787 | B1 | 7/2021 | Huke et al. |
| 11,100,753 | B1 | 8/2021 | Huke et al. |
| 11,189,133 | B2 | 11/2021 | Neely et al. |
| 11,189,134 | B2 | 11/2021 | Neely et al. |
| 2001/0016509 | A1 | 8/2001 | Kusuda |
| 2001/0039209 | A1 | 11/2001 | Deweese et al. |
| 2002/0187836 | A1 | 12/2002 | Meyer |
| 2003/0190953 | A1 | 10/2003 | Deweese et al. |
| 2004/0229671 | A1 | 11/2004 | Stronach et al. |
| 2005/0063365 | A1 | 3/2005 | Mathew et al. |
| 2005/0101385 | A1 | 5/2005 | Kido |
| 2005/0125685 | A1 | 6/2005 | Samuelsson et al. |
| 2005/0170886 | A1 | 8/2005 | Miller |
| 2005/0176496 | A1 | 8/2005 | Stronach |
| 2006/0035712 | A1 | 2/2006 | Eastman et al. |
| 2006/0246990 | A1 | 11/2006 | Downes |
| 2006/0279834 | A1 | 12/2006 | Eiselt |
| 2007/0197281 | A1 | 8/2007 | Stronach |
| 2007/0225069 | A1 | 9/2007 | Garahi et al. |
| 2008/0214290 | A1 | 9/2008 | Lee |
| 2008/0227532 | A1 | 9/2008 | Gelman et al. |
| 2008/0234051 | A1 | 9/2008 | Mcnutt et al. |
| 2008/0248846 | A1 | 10/2008 | Stronach et al. |
| 2009/0069077 | A1 | 3/2009 | Saito et al. |
| 2010/0144428 | A1 | 6/2010 | Fontaine et al. |
| 2010/0331066 | A1 | 12/2010 | Jung et al. |
| 2011/0093858 | A1 | 4/2011 | Friedfertig et al. |
| 2011/0250938 | A1 | 10/2011 | Bassignana et al. |
| 2012/0028703 | A1 | 2/2012 | Anderson et al. |
| 2013/0007648 | A1 | 1/2013 | Gamon et al. |
| 2014/0066189 | A1 | 3/2014 | Brooks et al. |
| 2014/0274343 | A1 | 9/2014 | Herbert |
| 2014/0274390 | A1 | 9/2014 | Kasten |
| 2014/0315609 | A1 | 10/2014 | Miller et al. |
| 2015/0018085 | A1 | 1/2015 | Herbert |
| 2015/0228163 | A1 | 8/2015 | Clarebrough et al. |
| 2016/0189483 | A1 | 6/2016 | Ballman |
| 2016/0273758 | A1 | 9/2016 | Fujimura |
| 2017/0208249 | A1 | 7/2017 | Choi et al. |
| 2017/0372561 | A1 | 12/2017 | Aronson et al. |
| 2018/0154266 | A1 | 6/2018 | Greiner, Jr. et al. |
| 2019/0035223 | A1 | 1/2019 | Parthimos |
| 2019/0051099 | A1 | 2/2019 | Pawloski et al. |
| 2019/0122502 | A1 | 4/2019 | Aronson et al. |
| 2019/0251789 | A1 | 8/2019 | Waters |
| 2019/0325707 | A1 | 10/2019 | Aronson et al. |
| 2020/0027307 | A1 | 1/2020 | Lind et al. |
| 2020/0175820 | A1 | 6/2020 | Miller et al. |
| 2020/0286333 | A1 | 9/2020 | Waters |
| 2021/0027569 | A1 | 1/2021 | Gelman et al. |
| 2021/0158661 | A1 | 5/2021 | Fulton et al. |
| 2021/0217280 | A1 | 7/2021 | Lutnick et al. |
| 2021/0241582 | A1 | 8/2021 | Neely et al. |
| 2021/0256650 | A1 | 8/2021 | Huke et al. |
| 2021/0286594 | A1 | 9/2021 | Lee et al. |
| 2021/0287485 | A1 | 9/2021 | Asher et al. |
| 2021/0287494 | A1 | 9/2021 | Amaitis et al. |

FOREIGN PATENT DOCUMENTS

| | | | |
|---|---|---|---|
| AU | 2001233162 | B2 | 9/2006 |
| AU | 785176 | B2 | 10/2006 |
| AU | 2021215205 | A1 | 9/2021 |
| CA | 3107715 | A1 | 8/2021 |
| CN | 102883785 | A | 1/2013 |
| EP | 1076321 | A1 | 2/2001 |
| EP | 3859698 | A1 | 8/2021 |
| GB | 2591402 | A | 7/2021 |
| HK | 1220028 | A1 | 4/2017 |
| JP | 6903805 | B1 | 7/2021 |
| JP | 2021101355 | A | 7/2021 |
| JP | 6923835 | B1 | 8/2021 |
| JP | 2021117643 | A | 8/2021 |
| JP | 2021119540 | A | 8/2021 |
| KR | 20020088709 | A | 11/2002 |
| KR | 20050074224 | A | 7/2005 |
| KR | 20080083955 | A | 9/2008 |
| KR | 101335418 | B1 | 12/2013 |
| KR | 101406340 | B1 | 6/2014 |
| WO | 0025876 | A1 | 5/2000 |
| WO | 0165507 | A2 | 9/2001 |
| WO | 0177964 | A2 | 10/2001 |
| WO | 0191872 | A1 | 12/2001 |
| WO | 0167352 | A8 | 2/2002 |
| WO | 0164305 | A8 | 3/2003 |

(56) References Cited

FOREIGN PATENT DOCUMENTS

| | | | |
|---|---|---|---|
| WO | 2008024705 | A2 | 2/2008 |
| WO | 2014159971 | A1 | 10/2014 |
| WO | 2015076682 | A1 | 5/2015 |

METHOD AND SYSTEM FOR CONDUCTING WAGERS

CROSS REFERENCE TO RELATED APPLICATIONS

This application is a continuation of U.S. patent application Ser. No. 17/572,483, filed Jan. 10, 2022, which claims the benefit of and priority to U.S. Provisional Application No. 63/144,660 filed Feb. 2, 2021, both of which are incorporated herein by reference.

FIELD OF THE DISCLOSURE

The disclosure field generally relates to gameplay stations and gaming servers, including gaming consoles, gaming machines, mobile devices, personal computers, or networked gaming machines, such as gameplay stations and gaming servers found in casinos or betting environments, and related methods of operation.

BACKGROUND

Within the gambling or gaming industry, including sports betting, esports betting, games of chance, etc., traditional gaming machines include slot machines, poker machines, video lottery terminals, gaming consoles, and similar devices. These traditional gaming machines are configured to provide an interface for wagering on game events and have proven popularity. However, players quickly become tired of various adaptations of existing gaming machines, requiring the development of new and inventive ways to represent or play games on such gaming machines. For this reason, game creators must continually invent new and innovative ways to represent games and gameplay to stimulate players and encourage further interest.

Many traditional gaming machines rely on displaying a game of chance, for example, games based on randomized events and/or fixed odds. These gaming machines employ lights, video displays, creative animations, and sounds to engage a player's interest and may allow a player the opportunity to play independently of others at their own selected pace, placing wagers up to every few seconds. The display and individualized control of gameplay accommodate players that seek a game that provides more immediate and sustained rewards than traditional games of skill or strategy.

Many players prefer games with dynamic experiences where the gameplay experience changes automatically relative to the actions and wagers of other players or with time. Traditional games of skill often involve multiple players and can introduce some variability in objectives and awards based on the input of the players or on changing circumstances or events related to the gaming, but require increased information, complex coordination methods, and increased time to successfully conduct.

Efforts have been made to represent traditional games of skill-based gaming formats in gaming machines to combine the most appealing features of each, including the dynamic and engaging gameplay experience of skills-based games and the convenience, aesthetics, and scalability of gaming machines. Unfortunately, existing efforts to develop a gaming machine or system capable of combining the advantages of traditional gaming machines and traditional games of skill have had only limited success. Existing methods are particularly limited by the information, coordination, and time demands placed on the gaming machines in games of skill with multiple participants and generally maintain a static experience for a player despite other players' involvement.

These gaming machines often bodily incorporate a traditional multi-participant game, such as poker, into a video display that can allow a player the opportunity to place wagers that can be won or lost in a short time relative to the traditional game, possibly without the need for additional players, attendants, and the related delays in the enjoyment of the game that other participants may cause.

For example, some existing gaming machines provide game outcomes that generally include a displayed set of reels in columns with multiple symbols in each reel's symbol locations. Generally, players place wagers across fixed lines running left to right across the reels linking various symbols of the matrix, the wagers adding to a plurality of betting pools. Upon a wager being placed, the reels will briefly spin before coming to rest, with a set of selected symbols being displayed based on the final result of an event. Symbol combinations along various pay lines are compared to winning combinations in a paytable, with static prizes being awarded from the corresponding pool for matching combinations.

Unfortunately, despite the modernization of several aspects of electronic gaming, further expansion of electronic gaming is limited by regulatory constraints based on traditional gaming aspects, such as traditional bingo or horse race betting.

A further disadvantage of the above-described gaming machines is that they commonly use static gaming data that limit variation of the game and associated rewards. These restrictions essentially remove any dynamic interaction from a wagering game and prevent a player from enjoying variations in rewards and gameplay that could occur due to the participation of multiple players or the use of varying events. In particular, existing approaches are limited by the computing, networking, and gameplay challenges associated with conducting skills-based games for a plurality of participants scattered across different locations and playing at different times. As a result, existing gameplay approaches struggle to facilitate truly interactive gameplay for a player based on the participation and choices of other players separated from the player in time and space. Rather, they focus on conducting simulations of skills-based games solely for the instant player. Such gameplay experiences lack the feel and effect of live or in-person experiences such as horse racing, bingo, and/or other games.

Given the preceding discussion, there is a need for an improved gaming machine and method that incorporates the advantages of traditional games of skill in gaming machines to combine the most appealing features of each. A need exists for an improved gaming machine capable of providing a user with a dynamic and changing gameplay that corresponds to multiple players' participation while presenting the information necessary for strategic wagering in an easy-to-use and understandable manner.

SUMMARY

The embodiments disclosed herein are directed to providing an improved gaming system and method that addresses the problems above and enables the advantage of increased variability in gameplay and player participation. The embodiments may be employed to facilitate class I gaming, including traditional and social games where the game results are not random, advantageously enabling entertaining aspects of each of class I, class II and class III gaming to be presented under the lower regulatory restrictions of class I gaming. Embodiments of the present disclosure further facilitate a gameplay experience that is, for many or all gameplay intents and purposes, including the effects of other players and other players' selections on a particular player's experience, indistinguishable from live or in-person events.

According to a first aspect of the disclosed embodiments, there is a method for conducting a wager in a gaming system. The method includes using a gaming server to receive a gameplay request from one of a plurality of gameplay stations. Upon receipt of the gameplay request and each subsequent request, the gaming server automatically identifies a first plurality of events pending at the gaming server for attaching the first gameplay request to the first plurality of events. The events may include simulated events, historical events, and/or live events. The events further comprise parameters necessary for governing a wager on and/or determining a prize relating to the events, such as information regarding participants, event conditions, winning selections, etc.

The automatic identification of the first plurality of events pending at the gaming server may be performed in some different ways but may be dynamically based on the condition of events pending at the gaming server or the circumstances of the gameplay request, rather than only presenting static conditions for a wager. The dynamic selection of events for the wager advantageously maximizes the variability of wagering in the gaming system while also ensuring that the events are "live" for the wager.

The events may be considered "live" for the wager due to the events being presented in a time-dependent manner, such as by the events remaining pending for a limited and/or predetermined period, such as of time, and/or being presented as part of a temporal queue of events. In this way the pending events, including simulated events, historical events, and/or live events, can be active only for the predetermined period, permitting the gaming server to accept wagers, close betting, "perform" the events, and payout rewards in the same manner as in other traditional or social gaming environments without the need for performance of the events outside of the gaming server. Surprisingly, by introducing the events in a time-dependent manner, the gaming server is able to essentially present live traditional gaming to players while reducing processing requirements relative to known class II and class III gaming machines due to a more streamlined presentation of gaming information. This facilitates more-entertaining and more-engaging gameplay by allowing a player to participate in live or substantially live events, with the benefits of live and dynamic multi-player events on the gameplay experience and potential prizes being remotely located from the other players.

Pending events may include simulated events, historical events and/or live events available for active wagering at the gaming server. According to embodiments, the pending events are dynamically presented, such that different gameplay stations and/or gameplay requests may be presented with different events. The pending events may be activated from a pool of available events, such as a pool of historical events and/or a live or simulated events schedule. The pending events may be activated and deactivated in a time-dependent manner, singly or as a combined group. Deactivated events may be discarded and not used again for a predetermined period or recycled into the pool of available events for future activation and reuse at the gaming server.

In one aspect, the pending events may be selected from a database of events based on a number of predetermined criteria. For example, the pending events may be selected from a database of events based on the number of participants in the event, location of the event, location of the gaming server, and/or results (number of finishers, disqualifications, etc.). The predetermined criteria may result from regulatory constraints, house requirements, or otherwise, and may advantageously facilitate flexibility in conducting wagers across geographic and regulatory domains.

In identifying the first plurality of events pending at the gaming server according to certain embodiments, the gaming server may select a number of events pending at the gaming server from a total number of pending events, in other words from a pool of pending events. Any suitable number of pending events may define or be comprised in the pool of pending events. For example, the gaming server may select six events as the first plurality of events from a total number of 12 pending events in the pool of pending events. The selection may be made randomly or made in a time-dependent manner by selecting those events pending for the longest or the shortest amount of time.

Alternatively, all of the pending events in the pool of pending events may be selected as the first plurality of events. Here the total number of active events pending at the gaming server may be equal to the number of events in the first plurality of events. As in other embodiments, the selection may be made randomly or made in a time-dependent manner by selecting those events pending for the longest or the shortest amount of time.

There may be a predetermined maximum number of participants, i.e., players, for a particular pool or plurality of events. The predetermined maximum number of participants may be a function of a number of available handicapping methods or approaches, and described in greater detail below. As additional handicapping methods or approaches are available or utilized by the gaming system, the predetermined maximum number of participants may increase, and vice versa. In embodiments, this allows the gaming system to provide for a variegated gameplay experience, for example, a unique experience for each player. The system may automatically determine variable field sizes and is not limited to a specific number of participants in all embodiments. Rather, the number of participants may vary based on the events from which the first plurality of events may be determined.

In embodiments, the system may utilize variable load control for player aggregation. This system may advantageously prevent overload by throttling a time for a game to be open. A shorter pending time may be, for example, one second or less.

By governing or conducting the identification of the first plurality of events according to embodiments of the present disclosure, the gaming server can present players with the same experience as in traditional live gaming but on-demand, without the timing and location constraints of traditional live gaming or the restrictions of known class II and class III gaming machines. In a further advantage over existing gaming machines, the present embodiments allow for an improved level of variability in "live" gaming, such that different players can be presented with dynamically changing gaming conditions using the same events in the pool of pending events, while at the same time reducing the processing requirements for managing the gaming system. The dynamically changing gaming conditions increase player satisfaction and participation and further increase the security of the gaming system by preventing cheating.

In embodiments, the gaming system may offer a particular race, such as a historical horse race from a historical horse race database, regularly according to an interval. The historical horse race may be pending in the gaming system for a predetermined amount of time, such as 10 seconds, during which window a plurality of players may automatically become participants in the historical horse race through an identified first plurality of events. The gaming system may select the historical horse race as one of the first plurality of events for each player that submits a gameplay request during the predetermined amount of time for which the historical horse race is pending. This systems allows the players to simultaneously participate in and/or wager on the event, with the same gameplay effects and dynamics, including odds and prize pool dynamics, as if the players were attending a live and in-person horse race.

The gaming server may create a first event card comprising an ordered ranking of participants for each event of the first plurality of events. For example, an event card may include identifying a first-place finisher, a second-place finisher, and a third-place finisher for each event of the first plurality of events. In the step of identifying the first plurality of events, the first plurality of events may be selected as an ordered combination of events, such that a scorecard provides a first-place finisher, a second-place finisher, and a third-place finisher for a first selected event from the first plurality of events, followed by a first-place finisher, a second-place finisher, and a third-place finisher for a second selected event from the first plurality of events, and so forth. Accordingly, the same group of events may be used for multiple gameplay requests, i.e. corresponding to different players and/or to different playing instances or requests but in different and/or randomized orders. In this manner, the present disclosure's embodiments may be enabled to advantageously increase variability in gameplay even for multiple players conducting wagers simultaneously or otherwise in a period in which the same events are pending at the gaming server.

The gaming server may communicate event data about the first plurality of events to the gameplay station from which a gameplay request was received. The event data may include information relating to the participants in the events and/or the events' conditions. For example, where the event is a horse race or historical horse race, the participants may be racehorses and the information may include characteristics of the racehorse, a jockey riding the horse, a trainer affiliated with the racehorse and/or jockey, etc., such as is generally provided to players at a racetrack in a daily racing form or horse racing form. Conditions of such a horse race may include the length of the track, location, weather, date, time, etc. Further information may be provided to the gameplay station relating to the status of betting pools and the payouts involved, for example, corresponding to post time odds or mutuel payoffs at a horse race. The event data advantageously allows for a player to exercise skill in placing a wager regarding one or more events of the first plurality of events just as would be done if participating live and in person.

According to an embodiment, each gameplay station may be provided with a handicapping method to determine the odds and related payouts for a wager automatically. In combination with "live" gaming of the current disclosure, group wagering may be facilitated where players wager on the same races but with different handicapping methods. Surprisingly, although players may wager on the same group of races, the selection of different handicapping methods for each gameplay station provides the unexpected advantage of increasing variability between different players in the game for example, by changing the odds for each player, thereby enhancing the excitement and engagement of players, and simultaneously reducing risk by spreading wins and losses.

In some examples, each gameplay station may randomly select a handicapping method for each game or event. The gaming system may be configured to inform a player through the user interface of the selected handicapping method. For example, when the user allows the gameplay station to automatically determine a random handicapping method or a default handicapping method.

From the event data presented to the gameplay station on the first event card, a player may create a wager card comprising a predicted ranking of participants in each event of the first plurality of events. The wager card may correspond to what a player predicts is the event card. In embodiments, the objective of a given wager card may not be to match the event card exactly, but to match only certain parts of the event card, for example by selecting the first-place finisher of each event correctly while incorrectly selecting the second- and third-place finishers. While players creating or filling out a wager card corresponding to each event of the first plurality of events, it will be appreciated that this is merely exemplary and non-limiting. Players may, in embodiments, elect in real-time or substantially real-time to participate in fewer than a total number of the first plurality of events, the determination being made by filling out or creating the wager card for the selected events of the first plurality of events. For example, the user may leave fields corresponding to non-selected events blank. This may further add to a degree of variability, skill, and engagement of the disclosure method and system embodiments.

The wager card is then compared to the first event card to create a scorecard. The scorecard may identify correct and incorrect predictions of the player in a binary fashion, such as 1s and 0s. For example, where three events are selected as the first plurality of events and a first-, second- and third-place finisher are considered for each event, a binary scorecard where the wager card and the event card are identical—that is, where the player accurately selected all participants for all races—could be presented as 111111111. In another example, where the player's wager card selected the first-place finisher of each event correctly while incorrectly selecting the second- and third-place finishers, the binary scorecard could be presented as 100100100. The depicted arrangement is merely exemplary, and any suitable arrangement, depiction, or representation of correct and incorrect predictions may be utilized as suitable.

Each possible scorecard may be associated with a different award level, and a reward value may be determined from the award level corresponding to the scorecard. In embodiments, the determination of the reward value may be based on the award level, an amount wagered by the player, and a wager pool value. As would be understood from the present disclosure by one skilled in the art, the amount wagered by the player may be included in the gameplay request. In like manner, the wager pool value may be governed by a totalizer or other control device. The use of the award level, the amount wagered, and the wager pool value may be influenced in real-time or substantially real-time by the participation of other players at other gameplay stations, thereby further enhancing the variability and excitement of gameplay and resulting in an experience that in all aspects relating to wagering is effectively live.

According to an embodiment of the present disclosure, a gaming system may include a plurality of gameplay stations configured to communicate locally or remotely with a gaming server. In embodiments, the gameplay stations may communicate directly with other gameplay stations. The gameplay stations may include a housing, a display and a processor configured for operating a user interface. A player may provide an input at the user interface, such as by initiating a gameplay request, that can be communicated over a communication system to the gaming server. The communication system may utilize any suitable modality for communication, including wired and/or wireless communication modalities.

The gaming server may include a processor and a memory configured for performing the method of the current disclosure, such that the gaming server creates and manages a plurality of gameplay requests received from the gameplay stations. The gaming server may further comprise a communication system configured to receive information from the gameplay stations and transmit information to the gameplay stations.

According to varying embodiments, the features described in terms of the gaming server may be performed by each gameplay station individually while the gaming server operates as an aggregator. As an aggregator, the gaming server may provide a time-limited seed to initialize a random selection of events. Each gameplay station may be provided with the same seeds from the aggregator. Each gameplay station may select the same random selection of races locally, and each gameplay station may further store race data locally. Surprisingly, by employing the gaming server as an aggregator for distributing time-limited seeds to gameplay stations, processing requirements of the gaming system may be significantly reduced while increasing variability in gameplay and allowing each player to wager on the same set of races. Advantageously, the gaming station provides a pari-mutuel wagering, where each player in a group wagers on the same races, while enabling more rapid, variable and exciting gameplay for each player individually by improving the size and dynamism of the available prizes as players wager on the same events simultaneously or substantially simultaneously.

In one embodiment, the communications system connecting the gameplay stations and the gaming server may be a short-range wireless network, a long-range wireless network (i.e., mobile data network, internet network, etc.) or a wired connection, such that the gameplay stations and the gaming server can transmit information to one another. In a specific embodiment, the communications system connecting the gameplay stations and the gaming server may be a restricted or secure connection, such as peer-to-peer communication, an encrypted communication, etc.

Exemplary embodiments of the system and method for gaming enable a less complex, more easily controlled, and more entertaining experience for players by providing events in a "live" manner and with greater variability relative to known gaming machines and traditional gaming methods. The problems of regulatory schemes for class II and class III gaming machines are mitigated by a gaming server creating "live" events for wagers based on time-dependent activation and deactivation of events at the gaming server, such that different combinations of events are available to players based on the timing of a corresponding gameplay request.

As a result, players in different locations may be enabled to place wagers on the same events or an overlapping combination of events simultaneously or substantially simultaneously, with the same effects on the gameplay experience as if they were wagering on the events live and in the same place. Processing requirements for the gaming system are further reduced by providing a moving selection of events for wagers, based on the timing of a corresponding request or presented on-demand in response to a gameplay request.

The moving selection of events further improves player satisfaction and reduces the possibility of cheating, by introducing increased variability in wagering, without increasing the complexity of the system or increasing processing costs.

These and other disclosure features will become better understood by reference to the following description, appended claims, and accompanying drawings.

Figure 1:
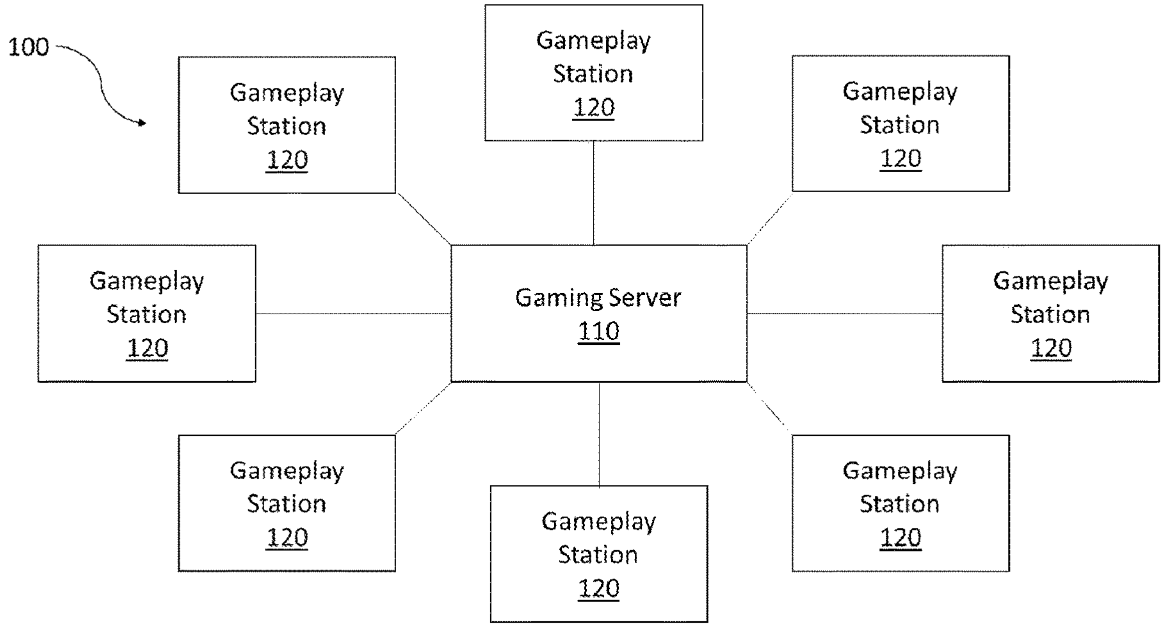
FIG. 1 is a diagrammatic view of a gaming system according to an embodiment of the disclosure.

The figures are not necessarily drawn to scale, but instead are drawn to provide a better understanding of the components, and are not intended to be limiting in scope, but to provide exemplary illustrations. The figures illustrate exemplary configurations of a system and method for gaming, and in no way limit the structures, configurations, or methods of the system and method for gaming according to the present disclosure.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. The dimensions, connections, and arrangements represented in the figures introduced above are to be understood as exemplary and are not necessarily shown in proportion. It should be understood, however, there is no intention to limit the disclosure to the specific embodiments disclosed, but on the contrary, the intention covers all modifications, alternative constructions, combinations, and equivalents falling within the spirit and scope of the disclosure.

The flowchart illustrations and block diagrams in the flow diagrams illustrate the architecture, functionality, and operation of possible implementations of systems, methods, and computer program products according to various present disclosure embodiments. In this regard, each block in the flowchart illustrations or block diagrams may represent a module, segment, or portion of code, which comprises one or more executable instructions for implementing the specified logical function(s).

It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart illustrations and/or block diagram block or blocks.

Examples of the current disclosure may be provided in terms referring to a bingo game, however, there is no intention to limit the disclosure thereto. Rather, one of ordinary skill in the art will recognize the possibility of applying the same principles of embodiments of the current disclosure to alternative gaming forms.

As referenced in the examples of the current disclosure, an "event" May be used to refer to a historical event, a simulated event, a live event and/or another set of parameters governing results of a wager. For example, an event may include, but is not limited to, a race or another sporting event, such as a historical horse race.

Embodiments of a gaming system and related methods provide "live" gaming and gameplay experiences in the gaming system with an increased level of variability while reducing the processing requirements of the gaming system and delays in gameplay.

The embodiments of the gaming system and the related methods according to the present disclosure advantageously creates "live" event wagering by providing events and managing gameplay requests in the gaming system in a time-dependent manner. Activating and deactivating one or more pending events for a player or plurality of players ensures that wagers are conducted on "live" events, while identifying a specific plurality of events for each gameplay request may increase variability in gameplay even for simultaneous gameplay requests. Thus, player satisfaction and participation are increased, while vulnerabilities to cheating and processing requirements for the system are reduced.

FIG. 1 illustrates an embodiment of a gaming system 100, including a gaming server 110 in communication with a plurality of gameplay stations 120 for enabling players to participate in gaming. The gaming system 100 may be configured to provide the gaming server 110 and the plurality of gameplay stations 120 in the same general location or in different locations, for example enabling mobile gaming and/or gaming in a casino-like environment.

Figure 2:
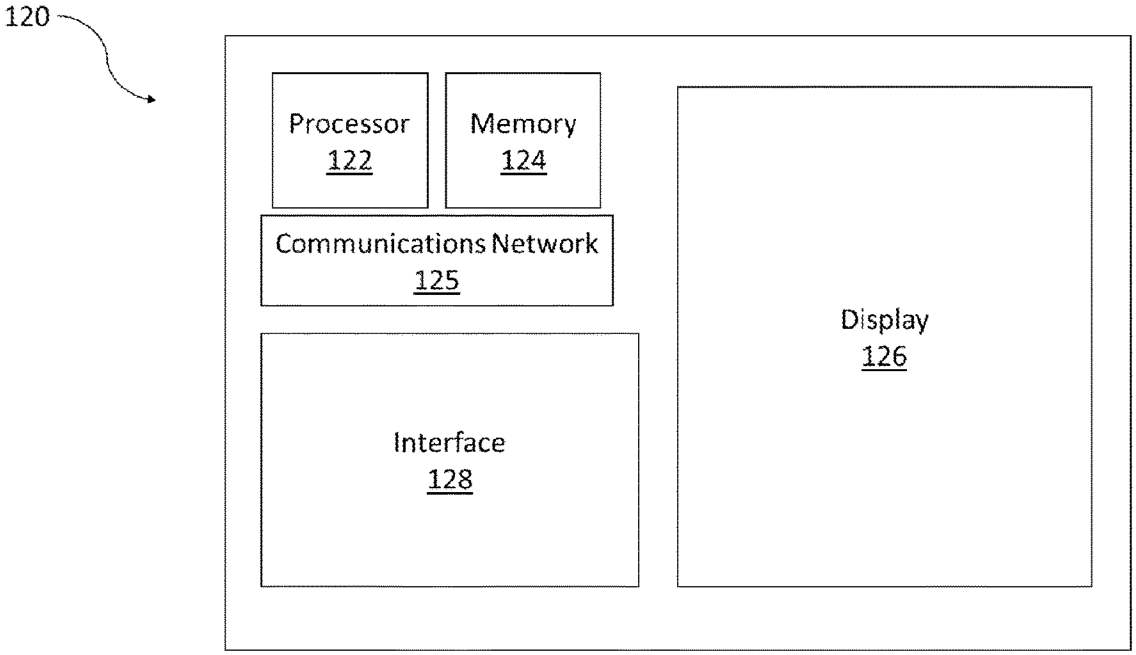
FIG. 2 is a diagrammatic view of a gameplay station according to the embodiment of FIG. 1.

As illustrated in FIG. 2, each of the plurality of gameplay stations 120 may generally include a processor 122 and a memory 124 for operating a corresponding display 126 and a corresponding user interface 128. In operation, each gameplay station 120 is arranged to facilitate an input by a player, for example at the user interface 128, such that a corresponding gameplay request is sent by a communications interface 125 from the gameplay station 120 to the gaming server 110. As would be understood by one of ordinary skill in the art, the user interface 128 may include a keyboard, touch screen, card reader or other value receiving device, speakers, and/or other components as would be understood by one of ordinary skill in the art. Any suitable component or combination of components may be used.

Figure 3:
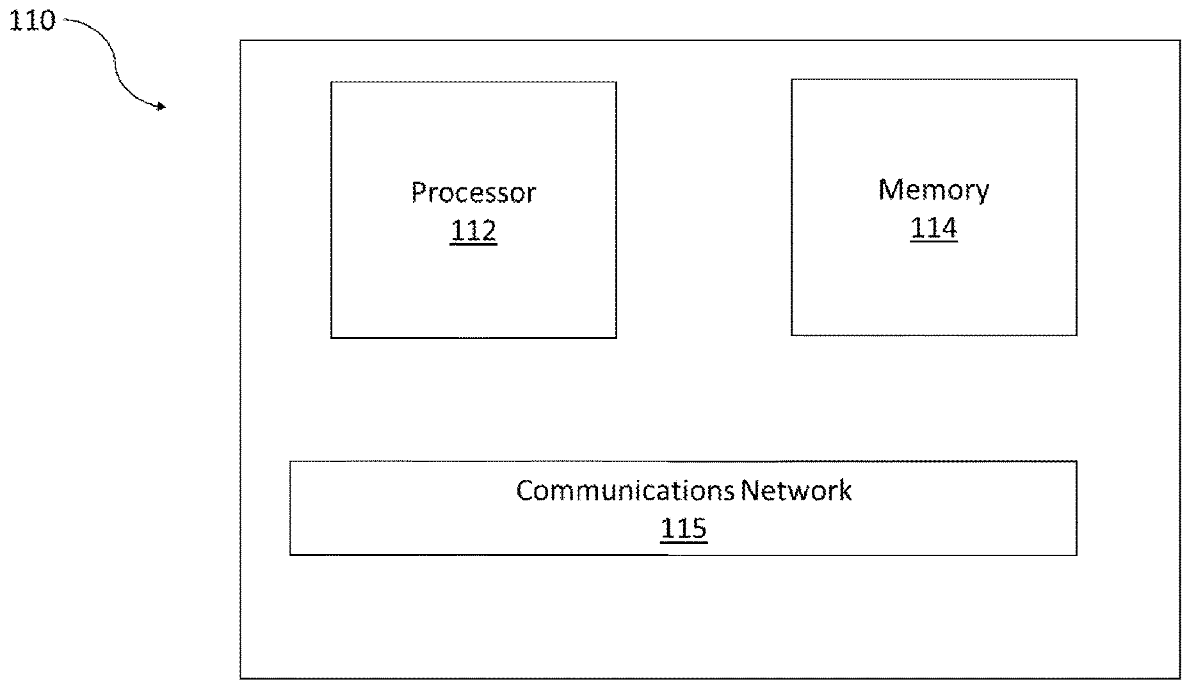
FIG. 3 is a diagrammatic view of a gaming server according to the embodiment of FIG. 1.

An embodiment of a gaming server 110 is shown in FIG. 3, including a processor 112, a memory 114 and a communications network 115, the gaming server 110 configured for conducting a plurality of concurrent games thereon. The gaming server 110 may be configured for receiving a gameplay request of a gameplay station 120 by means of the communications network 115.

According to alternative embodiments, it is appreciated that the gameplay stations 120 and the gaming server 110 may be implemented in a single computing system, such that the gameplay stations 120 are integrated into a single device with or without the gaming server 110 also implemented thereon. In integrated embodiments, the gaming server 110 and the gameplay stations 120 may be operated using the same processor and/or the same memory with a plurality of user interfaces 128.

The features described in terms of the gaming server 110 may be performed by each gameplay station 120 individually while the processor 112 of the gaming server 110 operates, in part, as an aggregator. As an aggregator, the processor 112 of the gaming server 110 may provide a time-limited seed used to initialize a selection of events, such as a random selection of events. Each of the gameplay stations 120 may be provided, in embodiments, with the same seeds from the aggregator, such that each gameplay station 120 may select the same random selection of races locally, and each gameplay station 120 may further store race data locally, for example in a local memory.

The gaming server 110 as an aggregator for distributing time-limited seeds to the gameplay stations 120 having local race data, processing requirements of the gaming system 100 may be significantly reduced. As the gaming server 110 is only required to generate and communicate time-limited seeds to the gameplay stations 120, processing requirements and communication requirements on the gaming server 110 are dramatically reduced by spreading the management of a wager to the gameplay stations 120 while retaining the advantages of group wagering, such as in pari-mutuel wagering. Unexpectedly, the benefits of reduced processing requirements on the gaming server 110 increase with the number of gameplay stations 120 employed, as the same seeds may be distributed to each gameplay station 120 without incurring more processing requirements as additional gameplay stations 120 connect to the gameplay server 110.

The gaming server 110 may additionally utilize variable load control for player aggregation. This may prevent overload of processing resources by throttling a time for an event to be open or pending. The shorter pending time may be, in embodiments, a second or less.

The gaming server 110 may be advantaged over existing computing devices generally and over existing gaming systems in particular as the server 110 runs faster by using the above-described seeds. The gaming server 110 need not, in embodiments, call up processing or database resources every time a new player wants to participate but rather may scale readily for additional or fewer players. Using the above-described seeds further advantageously reduces the size of the event database, as the same seeds can be used for multiple players.

The gaming system 100 is arranged to conduct a wager using a plurality of events pending at the gaming server 110 upon receipt of a gameplay request from one or more gameplay stations 120. According to embodiments, the gaming server 110 is adapted to identify a plurality of events for attaching to each gameplay request. Rather than presenting static conditions for each gameplay request from the one or more gameplay stations 120, the gaming server 110 may maintain pending events for a predetermined period, such as of time, and accordingly may provide a different selection of events for each gameplay request.

The predetermined period may be any suitable period, such as a fraction of a second, several seconds, minutes, hours, days, weeks, or otherwise. The predetermined period may be based on the nature and results of the events and/or player participation dynamics. For example, the predetermined period of time may be automatically and dynamically adjusted during the course of a week, with the predetermined period being shorter during peak hours wherein a larger number of players are placing wagers and longer during non-peak hours wherein a smaller number of players are placing wagers. In embodiments, the predetermined period may be longer or shorter for certain types of HHR or bingo events. The predetermined period may be adjusted based on combinations of different types of events in the plurality of events.

As discussed previously, gaming systems in the prior art are limited by regulatory requirements restricting the creation and/or operation of gaming machines based on static underlying data. For example, betting on an event is interpreted as not being conducted in a "live" manner.

In contrast to the prior art, the current disclosure has surprisingly shown the ability to overcome the problem of static gaming conditions by a gaming server managing the selection of a plurality of events for each gameplay request, such that wagering on and the gameplay experience of "live" events is facilitated even where or when wagering on a truly live event, such as a horse race, is not possible. Further, individual players in disparate locations can wager on these "live" events on-demand. Where multiple players conduct a wager substantially simultaneously, each player may rely on the same live events but receive a different experience due to variability in the selection of the events and/or the handicapping of events, further increasing the processing-demands savings and player participation in and enjoyment of the gaming system 100.

Figure 4:
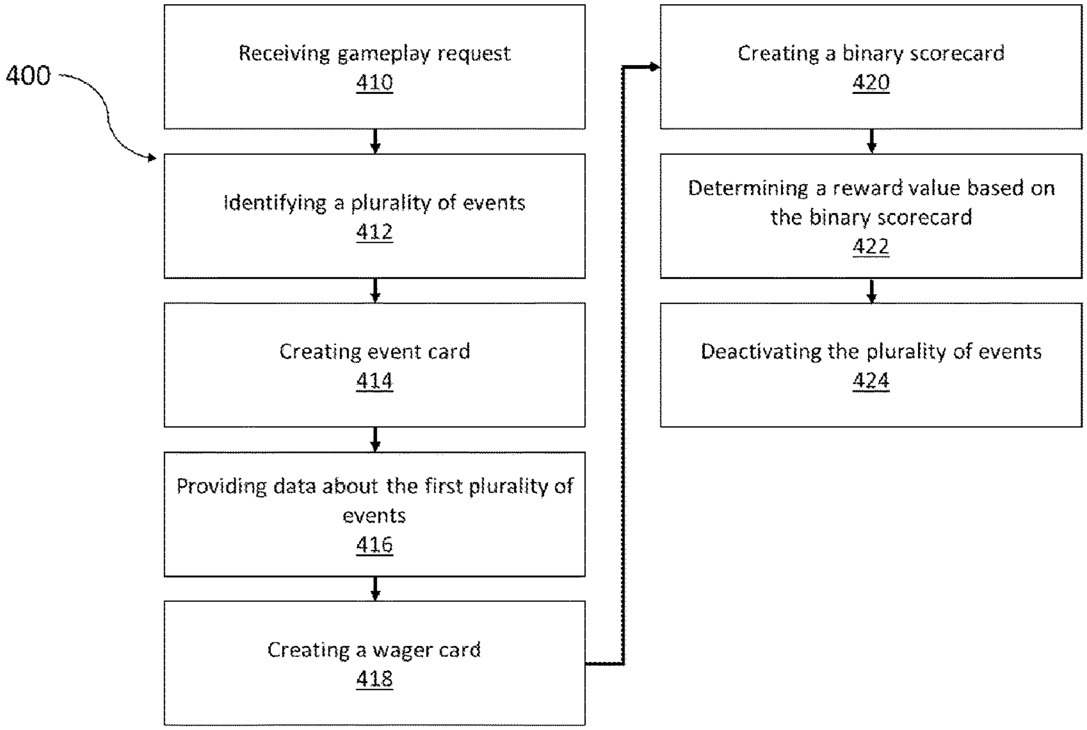
FIG. 4 is a flow diagram of a method for conducting a wager according to an embodiment of the present disclosure.

FIG. 4 illustrates a process 400 that may be performed at a gaming server 110 for determining whether to create a new game according to a method of the disclosure. After a gameplay station 120 is activated and a corresponding gameplay request is communicated to the gaming server 110, the gaming server 110 receives the gameplay request 410. According to varying embodiments, the gameplay request received by the gaming server 110 may include a wager amount and/or a wager level.

A gameplay request from a gameplay station 120 may be assigned to a first plurality of events for enabling a wager on the first plurality of events. For this purpose, upon receipt of the gameplay request and each subsequent request from the gameplay station 120, the gaming server 110 identifies a first plurality of events pending at the gaming server for attaching the first gameplay request to the first plurality of events 412. A second plurality of events may be identified for a second gameplay request from the gameplay station 120, a third plurality of events may be identified for a third gameplay request from the gameplay station 120, and so on.

The events may include simulated events, historical events, and/or live events. The events further comprise parameters necessary for governing a wager on the events, such as information regarding participants, event conditions, etc. The identification of a first plurality of events pending at the gaming server 110 may be performed in a number of different ways but may be dynamically based on the condition of events pending at the gaming server 110 or the circumstances of the gameplay request, rather than only presenting static conditions for a wager. The dynamic selection of events for the wager advantageously maximizes the variability of wagering in the gaming system while also ensuring that the events are "live" for the purposes of the wager.

The condition of events pending at the gaming server 110 may include, for example, a pendency of one or more of the events (such as a length of time that the events have been pending at the gaming server 110), a type of the events, or any other condition. The circumstances of the gameplay request which may affect the identification of the first plurality of events may include a location of the player, a time of day or week, the duration of play for that particular player at the particular gameplay station 120, the particular player's known preferences, combinations thereof, or any other suitable circumstance.

The events may be considered "live" for the wager due to the events being presented in a time-dependent manner, such as by the events remaining pending for a limited period and/or being presented as part of a temporal queue of events. In certain embodiments, the events may be pending at the gaming server 110 for no more than 30 seconds, no more than 10 seconds, or no more than 5 seconds. Further, the limited period may be dynamically selected based on a number of gameplay stations 120 and/or gameplay requests presented in the system. For example, the predetermined period may be reduced as the number of players in the gaming system 100 increases.

In this way, the events, including simulated events, historical events, and/or live events, can be active only for a predetermined period, permitting the gaming server 110 to accept wagers, close betting, "perform" the events, and payout rewards in the same manner as in other traditional or social gaming without the need for performance of the events outside of the gaming server 110. Surprisingly, by introducing the events in a time-dependent manner, the gaming server 110 can essentially present live traditional gaming to players while reducing processing requirements relative to known class II and class III gaming machines due to a more streamlined gaming information presentation. This advantageously results in a gameplay experience that is, for all or substantially all wagering intents and purposes, identical or substantially identical to the gameplay experience of live and in-person wagering events, such as bingo and horse racing games. The gaming system and method embodiments provide the benefits and gameplay experience of live and in-person wagering events and provide an improved, dynamic gameplay experience by providing improved variability through a plurality of events.

Pending events may include simulated events, historical events, and/or live events that are available for active wagering at the gaming server. By restricting the pendency of the events at the gaming server 110 to the predetermined period, the events are considered "live" in that they occur similarly as a live event, with betting closing, the event being "performed," and payouts being provided accordingly. This results in the gameplay experience having, for wagering purposes, the same benefits and experiences as truly live and in-person events.

According to embodiments, the pending events are dynamically presented, such that different gameplay stations 120 and/or gameplay requests may be presented with different events. The pending events may be activated from a pool of available events, such as a pool of historical events and/or a live or simulated events schedule. The pending events may be activated and deactivated in a time-dependent manner, singly or as a combined group. Deactivated events may be discarded and not used again for a predetermined period or may be recycled into the pool of available events for future activation and reuse at the gaming server.

In one aspect, the pending events may be selected from a database of events based on a number of predetermined criteria. For example, the pending events may be selected from a database of events based on a number of participants in the event, the location of the event, the type of event, the location of the gaming server, or the results of the event (number of finishers, disqualifications, etc.). The predetermined criteria may result from regulatory constraints, house requirements or otherwise, and may advantageously facilitate flexibility in conducting wagers across geographic and regulatory domains.

The pending events may be drawn from the database of events in any suitable manner; for example, the pending events may be drawn at predetermined intervals from the database of events based on the number and frequency of gameplay requests. In embodiments, as the gaming server 110 detects that a large number of players are submitting gameplay requests and/or that a peak gaming period is approaching, the gaming server 110 draws upon and/or makes available an increased pool of available events. The database of events may be located locally on the memory 114 of the gaming server 110, on the memory 124 of one or more gameplay stations 120, and/or remotely, such as on a cloud location.

In identifying a first plurality of events pending at the gaming server 110 according to certain embodiments, the gaming server 110 may select a number of events pending at the gaming server 110 from a total number of pending events, in other words from a pool of pending events. For example, the gaming server 110 may automatically select six events as the first plurality of events from a total number of 12 pending events. The selection may be made randomly or made in a time-dependent manner by selecting those events pending for the longest or the shortest amount of time. The selected events may be configured to overlap with the selected events for a plurality of gameplay stations 120 that have submitted gameplay requests within a predetermined period, such as within five seconds of each other any other suitable period.

Alternatively, all of the pending events may be selected as the first plurality of events. Here the total number of active events pending at the gaming server 110 may be equal to the number of events in the first plurality of events. As in other embodiments, the selection may be made randomly or made in a time-dependent manner by selecting those events pending for the longest or the shortest amount of time.

By governing the identification of a first plurality of events according to embodiments of the present disclosure, the gaming server 110 can present players with the same experience as in traditional live gaming but on-demand, without the timing and location constraints of live traditional gaming or the restrictions of known class II and class III gaming machines. In a further advantage over existing gaming machines, the present embodiments allow for an increased level of variability in "live" gaming, such that players can be presented with dynamically changing gaming conditions using the same events while at the same time reducing the processing requirements for managing the gaming system. The dynamically changing gaming conditions increase player satisfaction and participation and further increase the security of the gaming system 100 by preventing cheating.

The gaming server 110 may automatically create a first event card comprising an ordered ranking of participants for each of the first plurality of events 414, in embodiments a second event card comprising an ordered ranking of participants for each of a second plurality of events, and so on. As would be understood by one of ordinary skill in the art, various forms of ordered rankings are contemplated, such that an event card may be adapted for use with varying types of wagering, including sports wagering or other event-based wagering. The event cards may therefore take varying forms, including a predicted finisher, score, time, arrangement of numbers or places, etc.

For example, an event card may include identification of a first-place finisher, a second-place finisher, and a third-place finisher for each of the first plurality of events. In the step of identifying the first plurality of events, the first plurality of events may be selected as an ordered combination of events, such that a scorecard provides a first-place finisher, a second-place finisher, and a third-place finisher for a first selected event from the first plurality of events, followed by a first-place finisher, a second-place finisher, and a third-place finisher for a second selected event from the first plurality of events, and so forth.

Accordingly, the same group of events may be used for multiple gameplay requests but in different and/or randomized orders. That is, for a second gameplay request, the first plurality of events may be used but with the first selected event swapped with the second selected event, for example. In this manner, the present disclosure's embodiments may be enabled to advantageously increase variability in gameplay even for multiple players conducting wagers simultaneously or otherwise in a period in which the same events are pending at the gaming server 110.

The gaming server 110 may communicate event data about the first plurality of events to the gameplay station 120 from which a gameplay request was received 416. The event data may include information relating to the participants in the plurality of events and/or the events' conditions. For example, where the event is a horse race or historical horse race, the participants may be racehorses and the information may include characteristics of the racehorse, a jockey riding the horse, a trainer affiliated with the racehorse and/or jockey, etc., such as is generally provided to players at a racetrack in a daily racing form or horse racing form. Conditions of such a horse race may additionally include the length of the track, location, weather, date, time, etc. Further information may be provided to the gameplay station 120 relating to the status of betting pools and the payouts involved, for example corresponding to post-time odds or mutuel payoffs at a horse race.

According to an embodiment, each gameplay station 120 may be provided with a handicapping method for automatically determining the odds and related payouts for a wager. In combination with "live" gaming of the current disclosure, group wagering may be facilitated where players wager on the same events or races but with different handicapping methods. Surprisingly, although players may wager on the same group of races, the selection of different handicapping methods for each gameplay station provides the unexpected advantage of increasing variability between different players in the game and reducing risk by spreading wins and losses. In some examples, each gameplay station may randomly select a handicapping method for each gameplay request or event and/or may utilize a different default method for each game or event.

A handicapping method may be based on off-time odds, participant rankings, or position rankings in varying embodiments. For example, where events comprise horse races, a handicapping method may be based on a trainer ranking, a jockey ranking, a horse ranking, inside position (#1, 2, 3 pole position), outside position (#N, N−1, N-2 pole position), middle position, combinations thereof, or other combinations of odds or rankings as would be understood by one of ordinary skill in the art from a review of the current disclosure. A maximum number of different handicapping methods, such as 20, may be utilized by the gaming system in embodiments. However, the disclosure is not limited thereto.

The handicapping method may be randomly selected or provided as a default option in embodiments, as mentioned above, or may be manually selected by the player. For example, the player may have confidence in their ability to handicap a certain type of event but not other events in the plurality of events. In embodiments, the player may utilize a default handicapping method for one or more events of the first plurality of events and allow the system 100 to randomly select a handicapping method for other events. A player may use any combination of manual, default and random selection of handicapping method for one or more pluralities of events as suitable.

The user may also choose through the user interface "any" handicapping method, which prompts the gaming system to pick a handicapping method at random, for example by weight, jockey, color, etc. By providing different handicapping methods, including by randomly selecting handicapping methods, different gameplay experiences are provided for each user. This further reduces the risk to a site, such as a casino or a gaming host, of multiple winners in a single event, thereby mitigating the risk of large losses. That is, in embodiments the random handicapping of different players participating on a same overall group of events ensures that no two players win or lose at the same time.

From the event data presented to the gameplay station, a player may create a wager card comprising a predicted ranking of participants in each event of the first plurality of events 418. The wager card may correspond to what a player predicts is the event card. In embodiments, the objective of a given wager card may not be to match the event card exactly, but to match only certain parts of the event card, for example by selecting the first-place finisher of each event correctly while incorrectly selecting the second- and third-place finishers. Any suitable prediction or wager may be utilized. While the card may be presented to a player in the display 126 of the gameplay station 120, the underlying card may be represented as a digital, numerical, referential or other form communicated to or assigned by the gaming server 110 as would be understood by one of ordinary skill in the art.

In embodiments, the gameplay request may include a wager amount as input by a player.

In varying forms of the gaming system 100, the player may select a wager or enter a custom wager using the user interface 128, such as a card reader or other reader for receiving objects of value. The wager may accompany the gameplay request to the gaming server 110, be retained in the gameplay station 120 for communication or resolution after a result of a given wager is determined, or may be provided as part of the wager card.

The wager card is then compared to the event card in order to create a scorecard, such as a binary scorecard 420. The scorecard may identify correct and incorrect predictions of the player, such as in the embodiment of binary scorecards in the form of 1s and 0s. For example, where three events are selected as the first plurality of events and a first-, second- and third-place finisher are considered for each event, a binary scorecard where the wager card and the event card are identical (i.e. the player perfectly predicted the first-, second-, and third-place finishers for all events) could be presented as 111111111. In another example, where the wager card indicated the first-place finisher of each event correctly while incorrectly indicated the second- and third-place finishers, the binary scorecard could be presented as 100100100.

Each possible binary scorecard may be associated with a different award level, and a reward value may be determined from the award level corresponding to the binary scorecard 422. In embodiments, the determination of the reward value may be based on the award level, an amount wagered by the player, and/or a wager pool value. As would be understood from the present disclosure by one skilled in the art, the amount wagered by the player may be included in the gameplay request. In like manner, the wager pool value may be governed by a totalizer or other control device.

Exemplary embodiments of the system and method for gaming enable a less complex, more easily controlled, and more entertaining experience for players by providing events in a "live" manner and with greater variability relative to known gaming machines and traditional gaming methods. The problems of regulatory schemes for class II and class III gaming machines are mitigated by a gaming server creating "live" events for wagers based on time-dependent activation and deactivation of events at the gaming server, such that different combinations of events and gameplay experiences, such as different handicapping methods and different wager pool values, are available to players based on the timing of a corresponding gameplay request. This provides the gameplay and wagering benefits of live, in-person wagering and the benefits of traditional gaming machines in terms of location, aesthetics, scalability, and convenience. Processing requirements for the gaming system 100 are further reduced by providing a moving selection of events for wagers, based on the timing of a corresponding request or presented on-demand in response to a gameplay request.

The moving selection of events further improves player satisfaction and reduces the possibility of cheating, by introducing increased variability in wagering, without increasing the complexity of the system or increasing processing costs.

Embodiments of the present disclosure may comprise or utilize a special-purpose or general-purpose computer system that includes computer hardware, such as, for example, one or more processors and system memory, as discussed in greater detail below. Embodiments within the present disclosure scope also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the disclosure.

Transmission media can include a network and/or data links that can be used to carry program code in the form of computer-executable instructions or data structures, which can be accessed by a general-purpose special-purpose computer system. A "network" May be defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions may comprise, for example, instructions and data which, when executed by one or more processors, cause a general-purpose computer system, special-purpose computer system, or special-purpose processing device to perform a certain function or group of functions. Computer-executable instructions may be, for example, binaries, intermediate format instructions such as assembly language, or even source code.

The disclosure of the present application may be practiced in network computing environments with many types of computer system configurations, including, but not limited to, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. As such, a computer system may include a plurality of constituent computer systems in a distributed system environment. In a distributed system environment, program modules may be located in both local and remote memory storage devices.

The disclosure of the present application may also be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

By providing a gaming system and method for using the same according to the disclosed embodiments, existing gaming systems' requirements including complex and costly anti-cheat mechanisms and static gaming conditions are avoided. The gaming system embodiments provided herein advantageously allow a prospective player to play essentially on demand with live events, thereby increasing a player's enjoyment of the gaming machine generally, while meeting the regulatory requirements and retaining the advantages of traditional gaming.

While the invention has been illustrated and described in detail in the drawings and foregoing description, the same is to be considered as illustrative and not restrictive in character, it being understood that only the preferred embodiments have been shown and described and that all changes, equivalents, and modifications that come within the spirit of the inventions defined by following claims are desired to be protected.

Accordingly, features of the disclosed embodiments may be combined or arranged for achieving particular advantages as would be understood from the disclosure by one of ordinary skill in the art. Similarly, features of the disclosed embodiments may provide independent benefits applicable to other examples not detailed herein. For example, the disclosure is not to be considered restricted to gaming systems free of connections across large geographical areas, as methods of the disclosure are able to ensure the creation and concurrent pendency of a greater number of games using a smaller player pool than is possible in the prior art, reducing processing requirements and increasing the speed of gameplay.

It is to be understood that not necessarily all objects or advantages may be achieved under any embodiment of the disclosure. Those skilled in the art will recognize that the disclosed gaming system and related methods may be embodied or carried out in a manner that achieves or optimizes one advantage or group of advantages as taught without achieving other objects or advantages as taught or suggested.

The skilled artisan will recognize the interchangeability of various disclosed features. Besides the variations described, other known equivalents for various features can be mixed and matched by one of ordinary skill in this art to make or use a gaming system and related methods under principles of the present disclosure. It will be understood by the skilled artisan that the features described may be adapted to other types of systems, games, and regulatory requirements.

Although this disclosure describes certain exemplary embodiments and examples of a gaming system and related methods, it will be understood by those skilled in the art that the present disclosure extends beyond the specifically disclosed embodiments to other alternative embodiments and/or uses of the disclosure and obvious modifications and equivalents thereof. It is intended that the present disclosure should not be limited by the particular disclosed embodiments described above.

The invention claimed is:

1. A gaming system comprising:

a plurality of gameplay stations including at least a first gameplay station and a second gameplay station, each of the plurality of gameplay stations being configured to provide wagering in one or more gaming forms, and a gaming server in communication connection with each of the plurality of gameplay stations, wherein a memory storage of each of the gameplay stations has instructions stored thereon that, upon execution thereon by a processor, configure the gameplay station to perform the following to provide a wagering game receive payment for a wager through the payment device;

transfer the wager to one or more common better pool of a pari-mutuel wagering system;

wherein the gaming server is configured to establish a time-limited seed used to initialize a selection of a first plurality of events;

distribute the time-limited seed at least to the first gameplay station and to the second gameplay station;

receive a first gameplay request from the first gameplay station and a second gameplay request from the second gameplay station, wherein gameplay requests from the plurality of gameplay stations are accepted for the first plurality of events for a limited time period;

identify the first plurality of events pending at the gaming server and attaching the first gameplay request and the second gameplay request to the first plurality of events, the events pending at the gaming server being activated or deactivated in a time-dependent manner based on the limited time period; and communicate event data about the first plurality of events to each of the first gameplay station and the second gameplay station, wherein the gaming system is configured, at the gaming server or at one or more of the plurality of respective gameplay stations, to retrieve data relating to the plurality of events;

create a first wager card corresponding to the first gameplay station and a second wager card corresponding to the second gameplay station;

create a first event card indicative of the outcome of the each of the first plurality of events;

create a first binary scorecard by comparing the first wager card to the first event card, said first binary scorecard corresponding to a first award level of a plurality of award levels;

create a second binary scorecard by comparing the second wager card to the first event card, said second binary scorecard corresponding to a second award level of a plurality of award levels;

determine a first reward value based on the first award level corresponding to the first binary scorecard; and determine a second reward value based on the one of the second award level corresponding to the second binary scorecard.

2. The gaming system according to claim 1, wherein each of the plurality of gameplay stations is configured to provide wagering in a bingo gaming form.

3. The gaming system according to claim 2, wherein the first wager card is a first bingo card and the second wager card is a second bingo card.

4. The gaming system according to claim 1, wherein the gaming system is a bingo gaming system.

5. The gaming system according to claim 1, wherein each of the plurality of gameplay stations is configured to provide wagering in a racing gaming.

6. The gaming system according to claim 1, wherein each of the plurality of gameplay stations is configured to provide wagering in a racing gaming based on historical events.

7. The gaming system according to claim 1, wherein each of the plurality of gameplay stations is configured to provide wagering on simulated events.

8. The gaming system according to claim 1, wherein the gaming system is a historical horse racing (HHR) gaming system and each of the plurality of gameplay stations is configured to provide wagering in a historical horse racing (HHR) gaming.

9. The gaming system according to claim 1, wherein each of the plurality of gameplay stations is a dedicated historical horse racing (HHR) gaming machine that includes a payment device, a display system including a first display portion and a second display portion, an input system including at least one input device, a processor, a memory storage, and a housing that houses the display system, the input system, the processor, and the memory storage of the HHR gaming machine.

10. The gaming system according to claim 1, wherein the first plurality of events comprises less than a total number of events pending at the gaming server.

11. The system according to claim 1, wherein identifying the first plurality of events comprises randomly selecting the first plurality of events from a total number of events in a randomly ordered combination.

12. The system according to claim 1, wherein the limited time period is less than 10 seconds.

13. The system according to claim 1, wherein identifying the first plurality of events comprises activating the first plurality of events from a total number of events in response to the first gameplay request.

14. The system according to claim 1, wherein the gaming server is configured to deactivate the first plurality of events at the gaming server after determining the first reward value.

15. The system according to claim 1, wherein the gaming system is a historical horse racing (HHR) gaming system and each of the plurality of gameplay stations are configured to provide wagering in a historical horse racing (HHR) gaming, and wherein a historical horse race database is stored in a memory storage of the gaming server.

16. The system according to claim 1, wherein the gaming system is a historical horse racing (HHR) gaming system and each of the plurality of gameplay stations are configured to provide wagering in a historical horse racing (HHR) gaming, and wherein the historical horse race database is stored in a memory storage of one or more of the plurality of gameplay stations.

17. The system according to claim 1, wherein the gaming system is a historical horse racing (HHR) gaming system and each of the plurality of gameplay stations are configured to provide wagering in a historical horse racing (HHR) gaming, and wherein the historical horse race database is accessed remotely by the gaming server or one or more of the plurality of gameplay stations.

18. The system according to claim 1, wherein the first reward value is affected by both the first award level and the second award level.

19. The system according to claim 1, wherein the limited time period is determined by a number of gameplay requests received from the plurality of gameplay stations.

20. The system according to claim 1, wherein the first plurality of events is presented in a temporal queue of events.

21. A method for conducting a wagering game, the method comprising:

providing a gaming server, the gaming server being in communication connection with a plurality of gameplay stations, each of the plurality of gameplay stations being configured to provide wagering in one or more gaming forms, the plurality of gameplay stations including at least a first gameplay station and a second gameplay station;

establishing by the gaming server a time-limited seed used to initialize a selection of a first plurality of events;

distributing by the gaming server the time-limited seed at least to the first gameplay station and to the second gameplay station;

receiving by the gaming server a first gameplay request from the first gameplay station and a second gameplay request from the second gameplay station, wherein gameplay requests from the plurality of gameplay stations are accepted for the first plurality of events for a limited time period;

identifying by the gaming server the first plurality of events pending at the gaming server and attaching the first gameplay request and the second gameplay request to the first plurality of events, the events pending at the gaming server being activated or deactivated in a time-dependent manner based on the limited time period;

communicating by the gaming server event data about the first plurality of events to each of the first gameplay station and the second gameplay station;

retrieving data relating to the plurality of events;

creating a first wager card corresponding to the first gameplay station and a second wager card corresponding to the second gameplay station;

creating a first event card indicative of the outcome of the each of the first plurality of events;

creating a first binary scorecard by comparing the first wager card to the first event card, said first binary scorecard corresponding to a first award level of a plurality of award levels;

creating a second binary scorecard by comparing the second wager card to the first event card, said second binary scorecard corresponding to a second award level of a plurality of award levels;

determining a first reward value based on the first award level corresponding to the first binary scorecard; and determine a second reward value based on the one of the second award level corresponding to the second binary scorecard.

22. One or more non-transitory computer-readable media having stored thereon executable instructions that when executed by one or more processors of a gaming system cause the one or more processors to performing the method according to claim 21.

23. A method for conducting a wager, the method comprising:

receiving a first gameplay request from a first gameplay station at a gaming server;

identifying a first plurality of events pending at the gaming server and attaching the first gameplay request to the first plurality of events;

creating a first event card comprising an ordered ranking of participants for each of the first plurality of events;

communicating event data about the first plurality of events to the first gameplay station for facilitating creation of a first wager card at the first gameplay station, said first wager card comprising a predicted ranking of participants for each of the first plurality of events;

creating a first binary scorecard by comparing the first wager card to the first event card, said first binary scorecard corresponding to one of a plurality of award levels;

determining a first reward value based on the one of the plurality of award levels corresponding to the first binary scorecard.

* * * * *